US008327877B2

(12) United States Patent
Ito et al.

(10) Patent No.: US 8,327,877 B2
(45) Date of Patent: Dec. 11, 2012

(54) PRESSURE REDUCING APPARATUS (75) Inventors: Shinichi Ito, Toride (JP); Michihiro Hanada, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 894 days.

(21) Appl. No.: 12/366,170

(22) Filed: Feb. 5, 2009

(65) Prior Publication Data

US 2010/0006160 A1 Jan. 14, 2010

(30) Foreign Application Priority Data

Jul. 8, 2008 (JP) ................................. 2008-178008

(51) Int. Cl.
*F16K 31/12* (2006.01)

(52) U.S. Cl. .............. 137/505.25; 137/498; 137/505.14; 137/505.37; 251/331

(58) Field of Classification Search ............. 137/505.25, 137/505.36, 504.14, 505.28, 508, 505.37, 137/497, 498, 505, 494, 455; 251/331
See application file for complete search history.

(56) References Cited

U.S. PATENT DOCUMENTS

| 2,888,949 | A | * | 6/1959 | Evans | 137/505.25 |
|---|---|---|---|---|---|
| 2,935,083 | A | * | 5/1960 | Singer | 137/505.25 |
| 3,269,411 | A | * | 8/1966 | Teston | 137/613 |
| 3,372,707 | A | * | 3/1968 | Dunn | 137/505.25 |
| 3,386,469 | A | * | 6/1968 | Kelly | 137/505.38 |
| 3,664,369 | A | * | 5/1972 | Johnson | 137/484.4 |
| 3,926,204 | A | * | 12/1975 | Earl | 137/116.5 |
| 4,300,592 | A | * | 11/1981 | Hartley | 137/505.25 |
| 4,887,638 | A | * | 12/1989 | Hellquist et al. | 137/505.13 |
| 5,307,834 | A | * | 5/1994 | Tatarek-Gintowt et al. | 137/505.11 |
| 5,452,741 | A | * | 9/1995 | Tomita et al. | 137/505.26 |
| 6,019,121 | A | * | 2/2000 | Uehara | 137/116.5 |
| 6,039,071 | A | | 3/2000 | Tomita et al. | |
| 7,146,997 | B2 | * | 12/2006 | Francis et al. | 137/14 |
| 2003/0024573 | A1 | * | 2/2003 | Kilgore | 137/505.25 |

FOREIGN PATENT DOCUMENTS

| JP | 61-608 | 1/1986 |
|---|---|---|
| JP | 10-332041 | 12/1998 |

OTHER PUBLICATIONS

Japanese Office Action issued Nov. 16, 2010, in Patent Application No. 2008-178008 (with partial English-language translation).

* cited by examiner

*Primary Examiner* — Craig Schneider
*Assistant Examiner* — David Colon Morales
(74) *Attorney, Agent, or Firm* — Oblon, Spivak, McClelland, Maier & Neustadt, L.L.P.

(57) ABSTRACT

The present invention relates to a pressure reducing apparatus. A diaphragm made from an elastic material is provided in the interior of a body. The diaphragm includes a main body portion having a seat member that is capable of being seated on an inner tubular member of the body, a retaining portion disposed on an outer peripheral side of the main body portion and which is slidably displaceable with respect to the inner tubular member, and a skirt that is retained on a flange of the body. Additionally, by flexing of the skirt by means of an elastic force of a spring, the seat member thereof separates away from the inner tubular member.

7 Claims, 6 Drawing Sheets

PRESSURE REDUCING APPARATUS

BACKGROUND OF THE INVENTION

1. Field of the Invention

The present invention relates to a pressure reducing apparatus through which a supplied pressure fluid, which is reduced in pressure to a predetermined pressure value, can be derived.

2. Description of the Related Art

The present applicants, as disclosed in Japanese Laid-Open Patent Publication No. 10-332041, have proposed a pressure reducing valve that is capable of outputting a pressure fluid supplied from a primary side to a secondary side, after a pressure of the pressure fluid has been reduced to a predetermined pressure, which has been preset beforehand.

The pressure reducing valve includes a main body including primary side and secondary side ports, a bonnet fitted onto an upper part of the main body, and a handle that is pivotally supported rotatably on an upper part of the bonnet, with a diaphragm being disposed between the main body and the bonnet.

Further, a seat member on which a valve plug can be seated is formed on a lower part of the main body, the valve plug being disposed for displacement along an axial direction. In addition, the valve plug is urged toward the side of the seat member by a coil spring, and a stem is disposed in a center of the valve plug, which abuts against a diaphragm pressing member disposed in the center of the diaphragm and retaining the diaphragm thereon.

SUMMARY OF THE INVENTION

A general object of the present invention is to provide a pressure reducing apparatus in which the number of structural components making up the apparatus can be reduced along with reducing manufacturing costs, and in which operability in assembling the apparatus can be improved.

For achieving the aforementioned objects, the present invention is characterized by a pressure reducing apparatus comprising a body having a port through which a pressure fluid is supplied, a diaphragm having a valve member disposed displaceably in the interior of the body and which is seatable on a port of the body, a guide member that abuts against the body and which is guided along an axial direction thereof, and a skirt that extends from an edge of the valve member and which is retained by the body, and a spring interposed between the body and the diaphragm, which urges the diaphragm in a direction to separate from the port, wherein the skirt is disposed to face toward a space into which the pressure fluid is discharged.

According to the present invention, in comparison with the conventional pressure reducing apparatus in which a valve plug, a stem for supporting the valve plug, and a spring for seating of the valve plug each are disposed separately and respectively, the number of parts making up the pressure reducing apparatus can be reduced, along with reducing manufacturing costs, and operability in assembling the apparatus can be improved.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
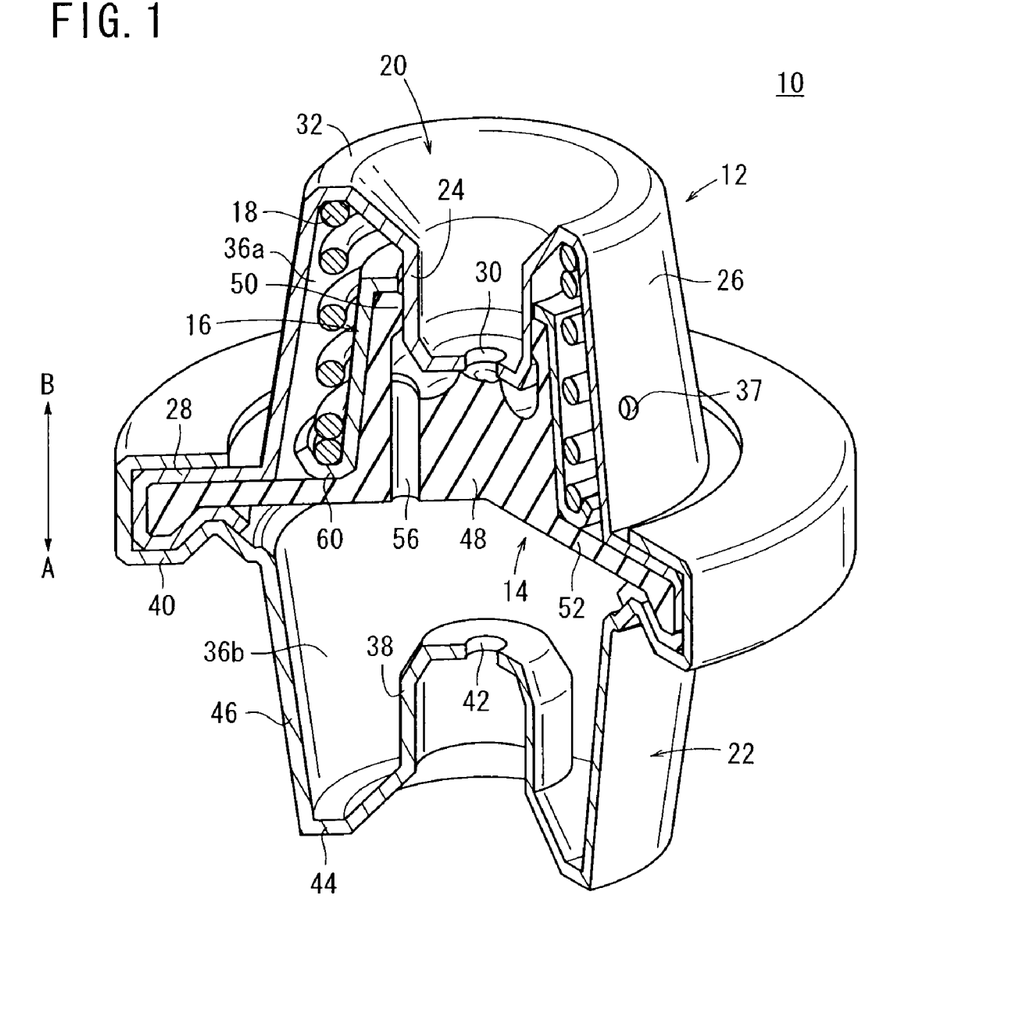
FIG. 1 is a partially cutaway overall perspective view of a pressure reducing apparatus according to an embodiment of the present invention.

In FIG. 1, reference numeral 10 indicates a pressure reducing apparatus according to an embodiment of the present invention.

Figure 2:
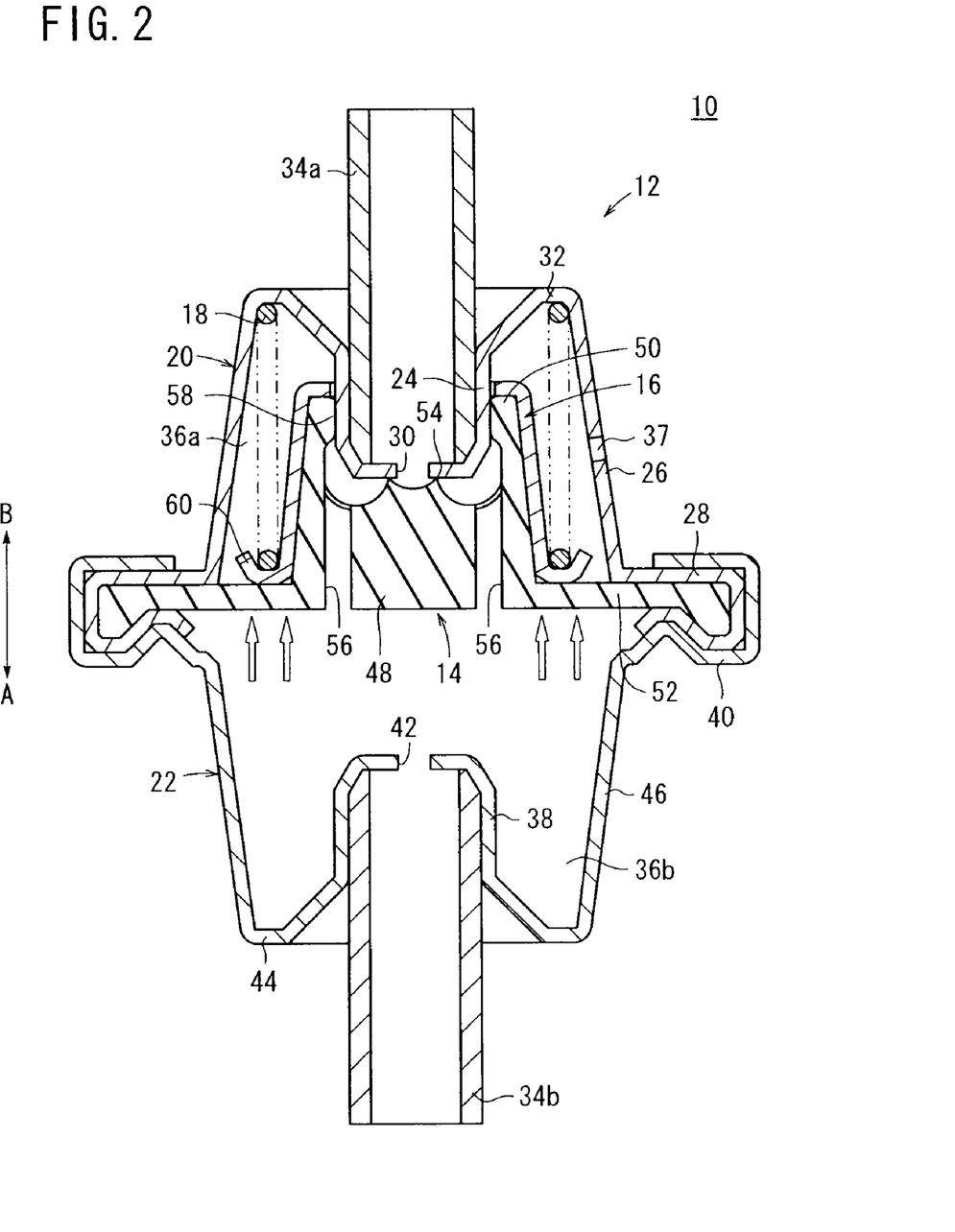
FIG. 2 is an overall cross sectional view showing a condition in which a joint member is installed on the pressure reducing apparatus of FIG. 1.
Figure 3:
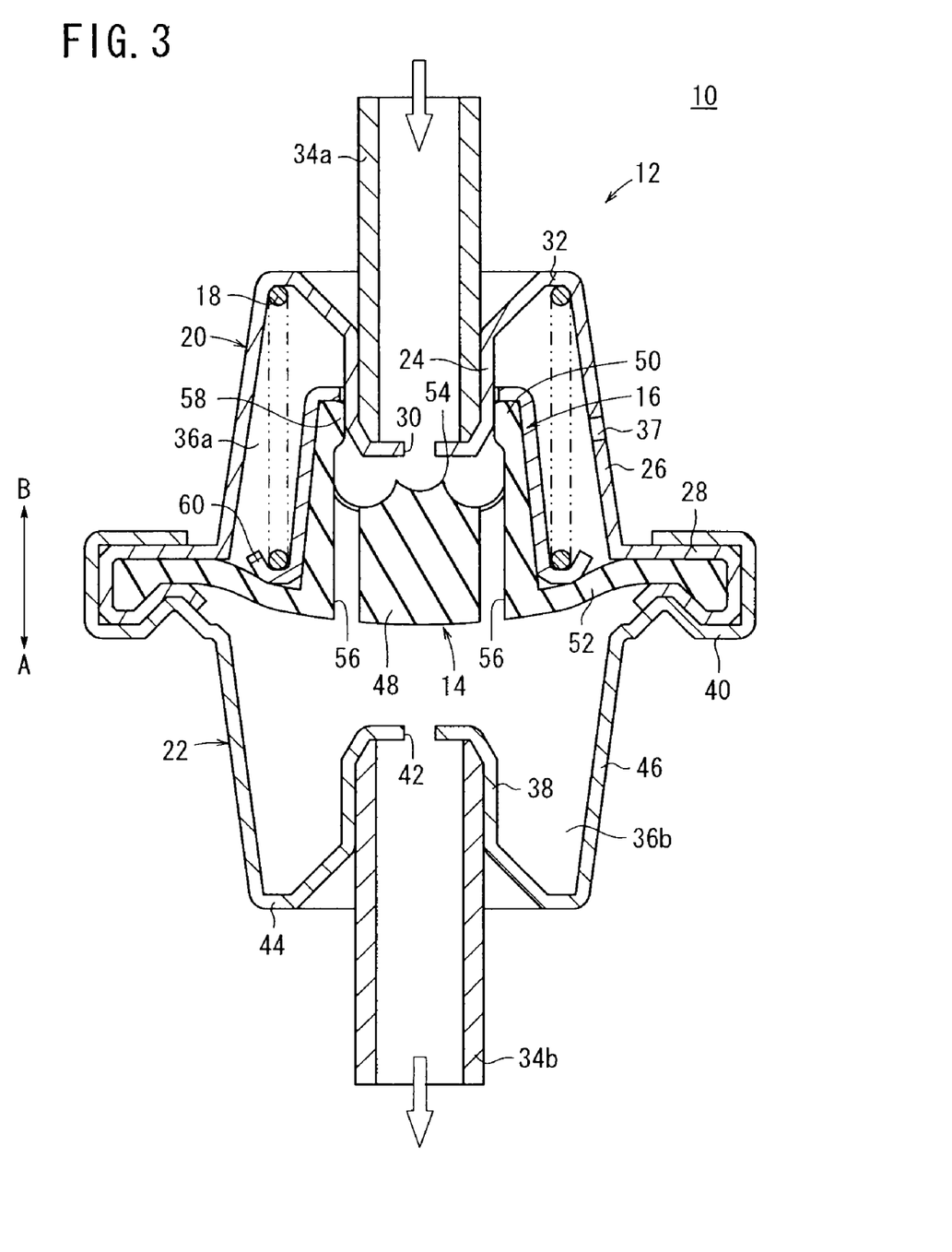
FIG. 3 is an overall cross sectional view showing a condition in which a diaphragm in the pressure reducing apparatus of FIG. 2 is separated from an inner tubular part of a body.

The pressure reducing apparatus 10, as shown in FIGS. 1 through 3, includes a body 12, a diaphragm 14 disposed in the interior of the body 12 and formed from an elastic material, a holder 16 disposed adjacent to the diaphragm 14, and a spring 18 interposed between the body 12 and the holder 16.

The body 12 is made up from first and second casings 20, 22 which are formed in substantially the same bottomed cylindrical shapes. The first and second casings 20, 22 each include inner tubular members (tubular members) 24, 38 having tubular shapes bulging outwardly from a central region, outer tubular members 26, 46 formed on outer circumferential sides of the inner tubular members 24, 38, and flanges 28, 40 formed on edges of the outer tubular members 26, 46 and which are expanded in diameter radially outwardly.

The inner tubular member 24 of the first casing 20 bulges outwardly in a cylindrical shape from one end of the first casing 20 toward the other end side (in the direction of the arrow A) thereof having the flange 28. An introduction hole (port) 30 through which the pressure fluid flows opens in the center of the inner tubular member 24. In addition, the open end of the inner tubular member 24 is joined to an end of the outer tubular member 26 through a junction 32, which is inclined and extends at a predetermined angle radially outwardly.

Further, a pipe shaped joint member 34a, which is connected to an unillustrated pressure fluid supply source or the like, is installed at the inner portion of the inner tubular member 24 and communicates with the introduction hole 30 (see FIG. 2 and FIG. 3).

The outer tubular member 26 extends from one end side of the first casing 20 (in the direction of the arrow B) to the other end side (in the direction of the arrow A), and is formed so as to expand in diameter radially outwardly toward the other end side (in the direction of the arrow A) thereof. In addition, the inner tubular member 24 is accommodated inside the outer tubular member 26, with a space 36a being provided between the outer tubular member 26 and the inner tubular member 24.

Further, a breathing port 37, which communicates between the space 36a and the exterior of the outer tubular member 26, is formed on the outer circumferential surface of the outer tubular member 26. When the diaphragm 14 is displaced, air outside the outer tubular member 26 and air inside of the space 36a are exchanged mutually with each other.

The flange 28 extends radially outwardly from the edge of the outer tubular member 26 at the other end side (in the direction of the arrow A) of the first casing 20, and the outer circumferential region thereof is folded over and formed with a U-shape in cross section radially inwardly, so as to retain the outer edge of a skirt 52 (to be discussed later) constituting the diaphragm 14.

The second casing 22 is disposed coaxially with the first casing 20. The inner tubular member 38 of the second casing 22 expands outwardly in a cylindrical shape from one end of the second casing 22 toward the other end side (in the direction of the arrow B) thereof having the flange 40, and a discharge hole 42 through which the pressure fluid flows opens in a center portion thereof. The inner tubular member 38 of the second casing 22 is disposed so as to confront and coincide with the inner tubular member 24 of the first casing 20.

Further, the end of the inner tubular member 38 is joined to an end of the outer tubular member 46 through a junction 44, which is inclined and extends radially outwardly at a predetermined angle.

As shown in FIG. 2 and FIG. 3, a pipe-shaped joint member 34b to which a fluid pressure device (not shown) is connected is mounted inside the inner tubular member 38 and communicates with the discharge hole 42.

The outer tubular member 46 extends from one end side (in the direction of the arrow A) of the second casing 22 toward the other end side (in the direction of the arrow B) thereof, and is formed so as to be enlarged in diameter radially outwardly gradually toward the other end side (in the direction of the arrow B). In addition, a space 36b is provided between the outer tubular member 46 and the inner tubular member 38 accommodated inside of the outer tubular member 46.

The flange 40 extends radially outwardly from the edge of the outer tubular member 46 at the other end side (in the direction of the arrow B) of the second casing 22, and the outer circumferential region thereof is folded over and formed with a U-shape in cross section radially inwardly, so as to further surround the flange 28 of the first casing 20 from the outer side thereof. As a result, the second casing 22 is connected with respect to the first casing 20.

The diaphragm 14 is formed, for example, from rubber or the like, and is disposed inside the first casing 20. The diaphragm 14 includes a main body portion (valve member) 48 formed in the center thereof, a retaining portion (guide member) 50 formed on an outer peripheral side of the main body portion 48 and which is slidably displaceable with respect to the inner tubular member 24 of the first casing 20, and the skirt 52, which extends radially outwardly from the edge of the main body portion 48. The diaphragm 14 is disposed coaxially with respect to the body 12 formed by the first and second casings 20, 22.

The main body portion 48 is made up from a columnar shaped block and is disposed to face toward the inner tubular member 24 of the first casing 20. A seat member (seat) 54, which is capable of abutment against an end surface of the inner tubular member 24, is formed at the center of the main body portion 48. Stated otherwise, the end surface of the inner tubular member 24 functions as a seating surface on which the seat member 54 can be seated.

The center of the seat member 54 is formed in an annular shape with a recessed semicircular shape in cross section, and is formed so as to abut against an outer circumferential side of the introduction hole 30 in the inner tubular member 24. Specifically, the seat member 54 covers the introduction hole 30 by abutment against the end surface of the inner tubular member 24 constituting the first casing 20, such that the flow of pressure fluid from the introduction hole 30 to the side of the diaphragm 14 (in the direction of the arrow A) is interrupted.

Further, a plurality of communication passages 56 (e.g., four) separated by predetermined intervals are formed in the main body portion 48 radially outwardly about the seat member 54. The communication passages 56 are formed parallel to the axis of the main body portion 48 and penetrate from one end side thereof (in the direction of the arrow B) having the seat member 54 to the other end side (in the direction of the arrow A). Specifically, the communication passages 56 enable communication between the one end side and the other end side of the main body portion 48, such that the pressure fluid supplied to the introduction hole 30 of the first casing 20 flows through to the side of the second casing 22 (in the direction of the arrow A). On the main body portion 48, the end surface facing the inner tubular member 24 of the first casing 20 is formed in a recessed annular shape on an outer circumferential side thereof about the seat member 54, with the plurality of communication passages 56 opening therein.

The retaining portion 50 projects at a fixed height in the axial direction from one end of the main body portion 48, with a projection 58 which bulges radially inwardly being formed on an inner circumferential surface of the retaining portion 50. In addition, the projection 58 is disposed in sliding contact with an outer circumferential surface of the inner tubular member 24 constituting the first casing 20. Owing thereto, when the seat member 54 of the diaphragm 14 separates from the inner tubular member 24 and pressure fluid flows therethrough, leakage of the pressure fluid passing between the retaining portion 50 and the inner tubular member 24 is prevented.

The skirt 52 is formed as a thin membrane or film extending from the other end of the main body portion 48 radially outwardly perpendicular to the axis, and the outer edge thereof is crimped and retained by the flange 28 of the first casing 20. As a result, an airtight condition is maintained between the flange 28 of the first casing 20 and the skirt 52, thereby sealing the fluid inside the pressure reducing apparatus 10.

The holder 16, for example, is formed in a cup like shape from a metallic material, and is disposed in the space 36a between the inner tubular member 24 and the outer tubular member 26 in the first casing 20. The holder 16 is inserted over the outer circumferential side of the inner tubular member 24 via a hole that opens in the center thereof. Further, the holder 16 is formed with a cross sectional shape that corresponds to the shapes of the main body portion 48, the retaining portion 50 and the skirt 52 that make up the diaphragm 14, the holder 16 being arranged in tight contact therewith, so as to cover the outer peripheral sides of the main body portion 48 and the retaining portion 50.

On the other hand, a spring bearing 60, which expands radially outwardly and abuts against the skirt 52 of the diaphragm 14, is provided on the holder 16. A spring 18 is interposed between the spring bearing 60 and the junction 32 of the first casing 20. The spring 18 is formed by a coil spring, for example, which urges the holder 16 and the skirt 52 of the diaphragm 14 toward the side of the second casing 22 (in the direction of the arrow A).

The pressure reducing apparatus 10 according to the embodiment of the present invention is constructed basically as described above. Next, operations and effects of the present invention shall be explained. The open valve state shown in FIG. 3, wherein the seat member 54 of the diaphragm 14 is separated by an elastic force of the spring 18 from the inner tubular member 24 of the first casing 20, and the introduction hole 30 is placed in communication with the discharge hole 42, shall be described as an initial state.

In such an initial state, by supplying a pressure fluid from an unillustrated pressure fluid supply source to the introduction hole 30 of the first casing 20 through the joint member 34a, the pressure fluid flows respectively through the plural communication passages 56 via a gap between the inner tubular member 24 and the seat member 54. After being introduced to the interior of the second casing 22, the pressure fluid is discharged to the exterior from the discharge hole 42.

Further, accompanying a gradual increase in pressure of the pressure fluid that has been discharged to the exterior from the second casing 22, the pressure inside the second casing 22 rises, whereupon the main body portion 48 and the skirt 52 constituting the diaphragm 14 are pressed toward the side of the first casing 20 (in the direction of the arrow B) in opposition to the elastic force of the spring 18. Owing thereto, the skirt 52 and the holder 16 are displaced upwardly (in the direction of the arrow B) against the elastic force of the spring 18, and the retaining portion 50 is slidably displaced along the outer peripheral surface of the inner tubular member 24, together with the main body portion 48 being displaced toward the side of the inner tubular member 24 (in the direction of the arrow B) so that the seat member 54 comes into abutment against the end surface of the inner tubular member 24 (see FIG. 2).

As a result, the introduction hole 30 of the first casing 20 is closed and blocked by the seat member 54, and the communication state between the introduction hole 30 and the discharge hole 42 communicated with the communication passages 56 is interrupted, whereby the pressure inside the second casing 22 is maintained at a predetermined pressure.

In this manner, by effecting a closing action of the diaphragm 14 accompanying the pressure change on the side of the second casing 22 from which the pressure fluid is output, the pressure of the pressure fluid inside the second casing 22 can be maintained at a desired pressure value.

In the foregoing manner, according to the present embodiment, owing to the structure in which the diaphragm 14 including the seat member 54 thereof is displaced in response to a rise in pressure of the pressure fluid, thereby enabling the communication state of the pressure fluid to be switched, the number of parts making up the apparatus can be significantly reduced compared to a conventional pressure reducing apparatus, in which a valve plug, a stem supporting the valve plug, and a spring that causes seating of the valve plug are each provided separately. Together therewith, costs for manufacturing the pressure reducing apparatus 10 can be reduced, together with improving ease of assembly of the apparatus.

Further, because the timing at which the seat member 54 blocks the introduction hole 30 by displacement of the diaphragm 14 is set by the elastic force of the spring 18, simply by exchanging the spring 18 with another spring 18 having a different elastic force, the timing at which the closing action of the diaphragm 14 is effected can freely be modified. As a result, by changing the timing at which the diaphragm 14 effects a closing action for interrupting communication between the introduction hole 30 and the discharge hole 42, the pressure value of the pressure fluid maintained inside the second casing 22 is capable of being freely adjusted to a desired pressure value.

Furthermore, in the communication-interrupted state, in which the seat member 54 is seated on the inner tubular member 24, the skirt 52 constituting the diaphragm 14 is retained by the flange 28 of the first casing 20 while the retaining portion 50 is in sliding contact with the outer peripheral surface of the inner tubular member 24. Owing thereto, communication between the interior of the diaphragm 14 (the space 36b) and the space 36a between the outer circumferential side of the diaphragm 14 and the first casing 20 can reliably be interrupted. As a result, the pressure fluid in the diaphragm 14 is prevented from leaking into the space 36a at atmospheric pressure, and the pressure of the pressure fluid maintained within the second casing 22 is prevented from being lowered.

Figure 4:
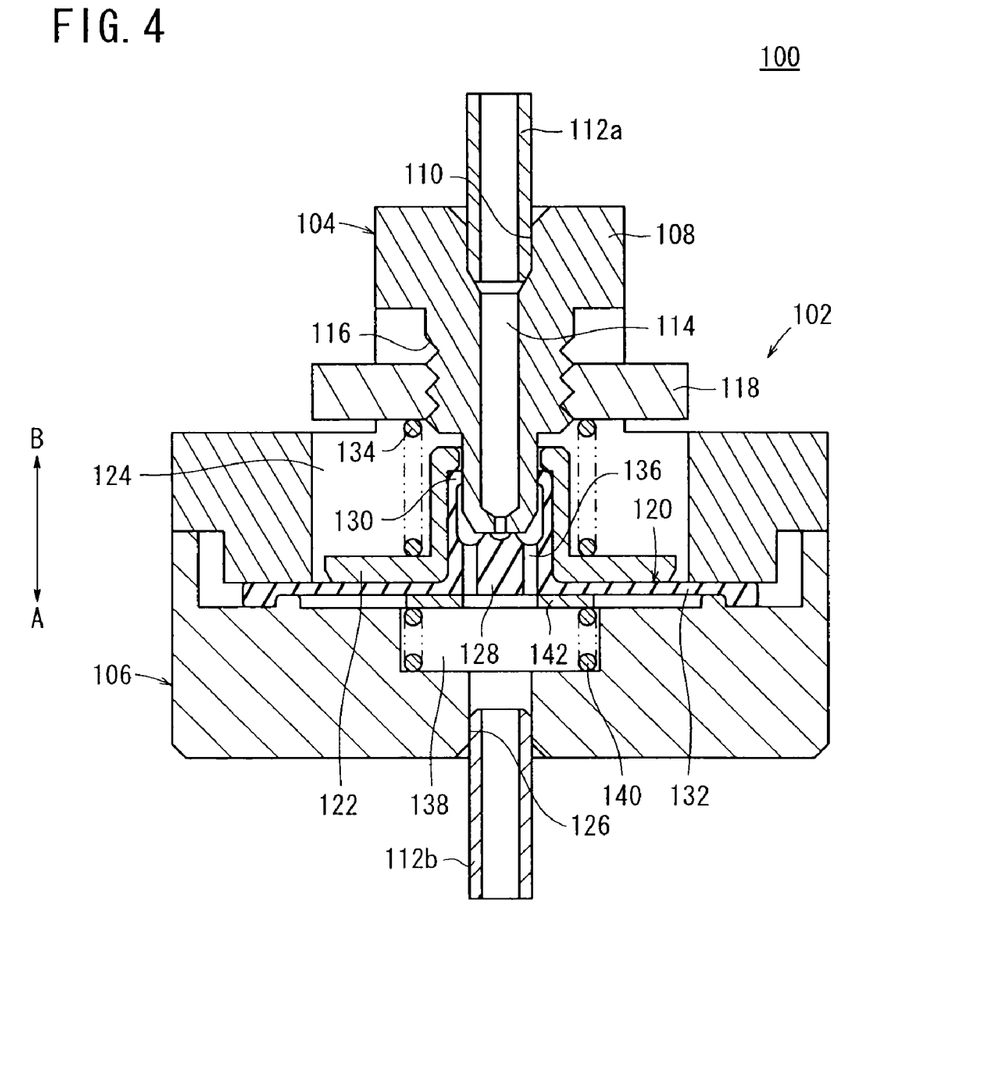
FIG. 4 is an overall schematic view showing a pressure reducing apparatus according to a modified example, in which a pressure value of a pressure fluid is capable of being freely adjusted by an adjustment handle.

On the other hand, for example, a pressure reducing apparatus 100 shown in FIG. 4 includes a first housing 104 and a second housing 106 constituting a body 102. The first housing 104 is formed with a T-shape in cross section, which projects in an upward direction. An introduction port 110 is formed therein and a joint member 112a is connected to a projecting section 108 formed on the upper end of the first housing 104, and a through hole 114 is formed along the axial direction thereof. Threads 116 are engraved at a region, which is recessed in a concave shape, on the outer circumference of the projecting section 108. A ring shaped adjustment handle (adjustment member) 118 is screw-engaged with the threads 116.

Further, the first housing 104 comprises an accommodating chamber 124 in which a diaphragm 120 and a holder 122 are accommodated on a lower portion of the projecting section 108. The main body portion 128 of the diaphragm 120 is disposed to face toward the projecting section 108, and a retaining portion 130 is provided in sliding contact with the outer peripheral surface of the projecting section 108. On the other hand, a skirt 132 of the diaphragm 120 is gripped between the first and second housings 104, 106.

Additionally, a first spring 134 is interposed between the holder 122, which is disposed in tight contact with the diaphragm 120, and the adjustment handle 118. The skirt 132 of the diaphragm 120 is urged, via the holder 122, toward the side of the second housing 106 (in the direction of the arrow A).

The second housing 106 includes a recess 138 that confronts the diaphragm 120 and is held in communication with a communication passage 136. A second spring 140 is disposed in the interior of the recess 138. The second spring 140 is interposed between a bottom wall surface of the recess 138 and a washer 142 disposed on a lower surface of the diaphragm 120, and urges the skirt 132 of the diaphragm 120 toward the side of the first housing 104 (in the direction of the arrow B).

Further, a discharge port 126 that communicates with the recess 138 is formed in the second housing 106, with a joint member 112b being connected to the discharge port 126.

In the pressure reducing apparatus 100 constructed in the foregoing manner, by rotating the adjustment handle 118 and displacing the same in the axial direction (the directions of arrows A and B) of the projecting section 108, the first spring 134, which engages with the lower surface of the adjustment handle 118, can be compressed and expanded. Owing thereto, the elastic force of the first spring 134 can freely be changed, and along therewith, movement of the diaphragm 120, which is displaced accompanying a rise in pressure of the pressure fluid, can be freely regulated. As a result, the main body portion 128 of the diaphragm 120 abuts against the end surface of the projecting section 108, whereupon communication between the introduction port 110 and the discharge port 126 is interrupted, and the pressure of the pressure fluid at the side of the second housing 106 can be maintained at a desired pressure value.

Stated otherwise, by changing the elastic force of the first spring 134 through the adjustment handle 118, the pressure value of the pressure fluid retained at the side of the second housing 106 can freely be set.

Figure 5:
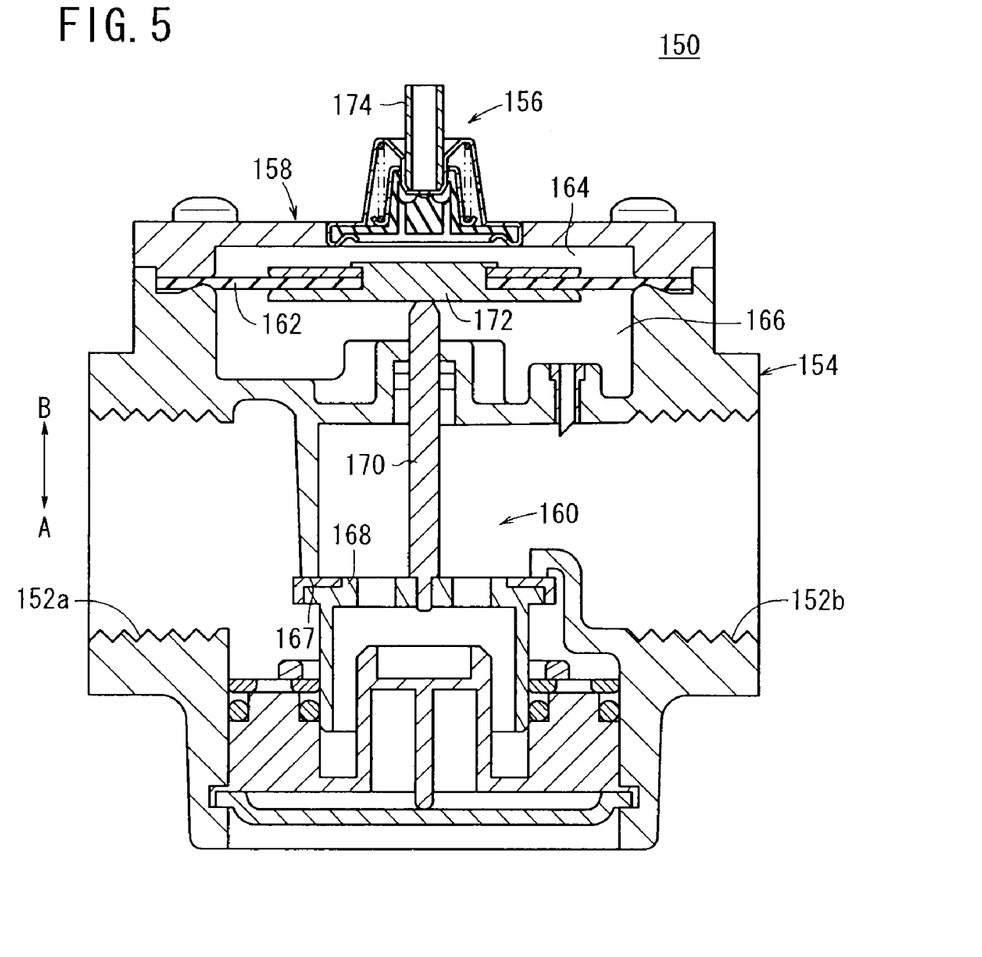
FIG. 5 is an overall schematic view showing a case in which the pressure reducing apparatus of FIG. 1 is applied to a pilot type pressure reducing valve.

Further, as shown in FIG. 5, the pressure reducing apparatus according to the above-described embodiment may be applied to a pilot-type pressure reducing valve 150. The pressure reducing valve 150 includes a body 154 having first and second ports 152*a*, 152*b*, a cover plate 158 connected to an upper part of the body 154 and on which a pressure reducing apparatus 156 is mounted, and a valve member 160, which is disposed displaceably in a central region of the body 154.

The outer edge portion of a diaphragm 162 is gripped between the body 154 and the cover plate 158. The diaphragm 162 is flexibly disposed, with a first space 164 being formed between the diaphragm 162 and the cover plate 158, and a second space 166 being formed between the diaphragm 162 and the body 154. The first space 164 is disposed confronting the pressure reducing apparatus 156 and communicates mutually therewith.

The valve member 160 includes a main valve 168 disposed between the first port 152*a* and the second port 152*b* and which is capable of being seated on a seat 167, and a stem 170, which is connected to the upper portion of the main valve 168 and supported for displacement along the axial direction (the directions of arrows A and B) of the body 154. An upper end of the stem 170 abuts against a retaining member 172 disposed in the center of the diaphragm 162, and upon flexure of the diaphragm 162, the stem 170 is pressed and displaced along the axial direction (the directions of arrows A and B) through the retaining member 172.

In the pressure reducing valve 150 constructed in the foregoing manner, a pilot pressure is introduced to the interior of the pressure reducing apparatus 156 through the joint member 174, and the pilot pressure flows into the first space 164. The pressure in the first space 164 gradually rises, whereby the diaphragm 162 is pressed and flexes toward the side of the second space 166 (in the direction of the arrow A), and the stem 170 is pressed downwardly through the retaining member 172.

As a result, the main valve 168 is pressed and displaced downwardly by the stem 170, and by separation of the main valve 168 from the seat 167, the first port 152*a* and the second port 152*b* are brought into communication and the pressure fluid flows from the first port 152*a* through to the second port 152*b*.

Next, the pressure fluid that flows through the second port 152*b* flows into the interior of the second space 166 through the communication port, whereby the pressure inside the second space 166 rises and the diaphragm 162 is pressed and flexes toward the side of the pressure reducing apparatus 156 (in the direction of the arrow B). By displacement of the diaphragm 162, the stem 170 is displaced upwardly. Along therewith, the main valve 168 rises, and by seating of the main valve 168 on the seat 167, communication between the first port 152*a* and the second port 152*b* is interrupted.

In the foregoing manner, with the pressure reducing valve 150 to which the pressure reducing apparatus 156 of the present invention is applied, the number of parts making up the apparatus can be reduced and the structure thereof can be made smaller in scale, compared to a structure for adjusting the pressure of a pressure fluid utilizing a conventional adjustment spring or the like.

Figure 6:
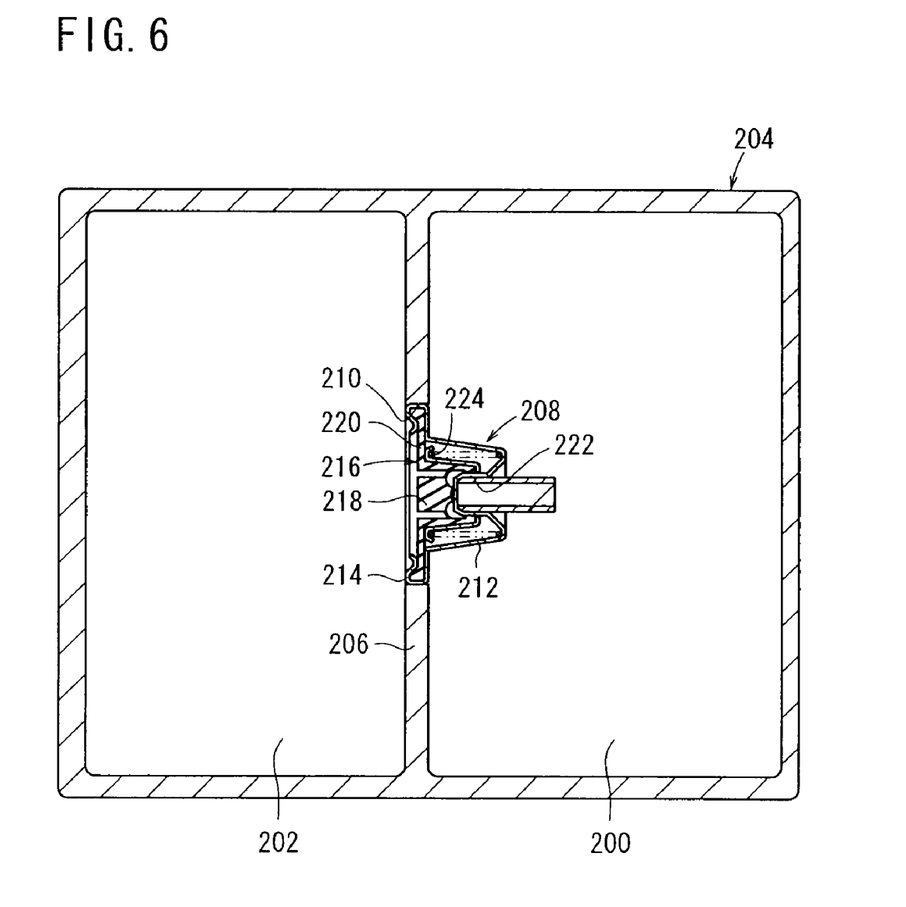
FIG. 6 is an overall schematic view showing a case in which the pressure reducing apparatus of FIG. 1 is applied to a pressure tank made up from first and second pressure tank sections.

Furthermore, as shown in FIG. 6, the pressure reducing apparatus according to the aforementioned embodiment may also be disposed in a pressure tank 204 made up from a first pressure tank (first chamber) 200 and a second pressure tank (second chamber) 202 filled with a pressure fluid. The pressure tank 204 is constituted by the first pressure tank 200 having a space of a predetermined volume in which the pressure fluid is filled, and a second pressure tank 202 disposed adjacent to the first pressure tank 200 through a partition wall 206 and having a space of a predetermined volume into which the pressure fluid is filled. A pressure reducing apparatus 208 is provided in the partition wall 206.

A flange 214 provided on a body 212 of the pressure reducing apparatus 208 is fixed in a hole 210 of the partition wall 206, with the body 212 being disposed so as to project toward the interior of the first pressure tank 200. On the other hand, a main body portion 218 and a skirt 220 of a diaphragm 216 are arranged in confronting relation to the side of the second pressure tank 202.

In this manner, with the pressure tank 204 equipped with the pressure reducing apparatus 208 therein, when a pressure fluid is gradually filled into the first pressure tank 200 from an unillustrated pressure fluid supply source, in a communicative state in which the main body portion 218 of the diaphragm 216 is separated from an inner tubular member 222 of the body 212, the pressure fluid flows therethrough toward the side of the second pressure tank 202. In addition, when the pressure of the pressure fluid in the second pressure tank 202 rises and reaches a predetermined pressure value, the diaphragm 216 is pressed and displaced toward the side of the body 212 in opposition to the elastic force of a spring 224, whereupon by the main body portion 218 coming into abutment against the inner tubular member 222 of the body 212, the state of communication between the first pressure tank 200 and the second pressure tank 202 is interrupted. As a result, the pressure of the pressure fluid in the second pressure tank 202 can be maintained at a reduced pressure state, with respect to the pressure of the pressure fluid in the first pressure tank 200.

Moreover, the aforementioned breathing port 37 may either be provided or not provided in the pressure reducing apparatus 10 of FIGS. 1 to 3, the pressure reducing apparatus 100 of FIG. 4, or the pressure reducing apparatus 156 applied to the pilot-type pressure reducing valve 150 of FIG. 5. On the other hand, a breathing port is unnecessary in the pressure reducing apparatus 208 installed in the pressure tank 204 as shown in FIG. 6.

The pressure reducing apparatus according to the present invention is not limited to the aforementioned embodiments, and various alternative or additional structures may be adopted therein without deviating from the essence and gist of the present invention.

What is claimed is:

1. A pressure reducing apparatus comprising:
a body having a first tubular member provided with a port through which a pressure fluid may be supplied;
a diaphragm having a valve member disposed displaceably in an interior of the body and which is seatable on the port of the body, a guide member formed unitarily with the diaphragm and having a portion in slidable contact with an outer circumference of the first tubular member, and able to be slidably displaced relative to the first tubular member and guided along an axial direction thereof by the movement of the diaphragm, wherein the outer periphery of the guide member is conically tapered to have a smaller diameter in a direction toward the portion in sliding contact with the outer circumference of the first tubular member, and a skirt formed unitarily with the diaphragm that extends from an edge of the valve member and which is retained by the body;

a spring interposed between the body and the diaphragm, which urges the diaphragm in a direction to separate from the port, wherein the skirt is disposed to face toward a space into which the pressure fluid is discharged; and a rigid spring holder having a cup shape and covering the guide member, the spring holder being tapered complementary to the guide member, whereby the spring presses the portion of the guide member in sliding contact with the outer circumference of the first tubular member against the first tubular member.

2. The pressure reducing apparatus according to claim 1, wherein a second tubular member separated radially outwardly with respect to the first tubular member is formed on an outer circumferential side of the first tubular member, and a breathing port is formed on the second tubular member, which penetrates from an interior to an exterior of the second tubular member.

3. The pressure reducing apparatus according to claim 1, further comprising a projection, which projects toward the first tubular member, formed at the portion of the guide member in sliding contact with the outer circumference of the first tubular member.

4. The pressure reducing apparatus according to claim 1, the pressure reducing apparatus being disposed between a first chamber and a second chamber in which the pressure fluid is filled.

5. The pressure reducing apparatus according to claim 1, wherein the valve member includes an annular seat member, which is seated in a surrounding manner around the port.

6. The pressure reducing apparatus according to claim 5, further comprising an adjustment member capable of adjusting an elastic force of the spring, wherein a timing at which the valve member is seated on the port is adjusted through the adjustment member.

7. The pressure reducing apparatus according to claim 5, further comprising a plurality of communication passages in the valve member which penetrate in an axial direction about the seat member.

\* \* \* \* \*